United States Patent
Sic

(10) Patent No.: US 9,358,930 B1
(45) Date of Patent: Jun. 7, 2016

(54) STORAGE BIN FOR A VEHICLE INTERIOR

(71) Applicant: Ford Global Technologies, LLC, Dearborn, MI (US)

(72) Inventor: Steven Sic, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/626,231

(22) Filed: Feb. 19, 2015

(51) Int. Cl.
*B60R 7/00* (2006.01)
*B60R 7/06* (2006.01)
*B60R 7/08* (2006.01)
*B60N 3/10* (2006.01)

(52) U.S. Cl.
CPC . *B60R 7/06* (2013.01); *B60N 3/101* (2013.01); *B60R 7/087* (2013.01)

(58) Field of Classification Search
CPC .......... B60R 7/06; B60R 7/087; B60N 3/101

USPC ........... 296/37.8, 24.34; 224/926; 248/311.2, 248/314

See application file for complete search history.

(56) References Cited

U.S. PATENT DOCUMENTS

| 4,536,980 | A | 8/1985 | Fleming |
| 6,843,458 | B1 | 1/2005 | Robinson et al. |
| 8,191,847 | B2 | 6/2012 | Mclaughlin et al. |
| 8,485,581 | B2 * | 7/2013 | McKnight ............... B60R 11/00 296/24.34 |

* cited by examiner

*Primary Examiner* — Joseph D Pape
(74) *Attorney, Agent, or Firm* — Vichit Chea; Brooks Kushman P.C.

(57) ABSTRACT

A storage bin includes a base, a plurality of pins supported by and moveable relative to the base, and a locking plate. The locking plate includes a plurality of sidewalls that each define an opening for one of the pins to pass therethrough. Each of the sidewalls are configured to engage one of the pins to lock the pins relative to the base in response to movement of the locking plate.

20 Claims, 3 Drawing Sheets

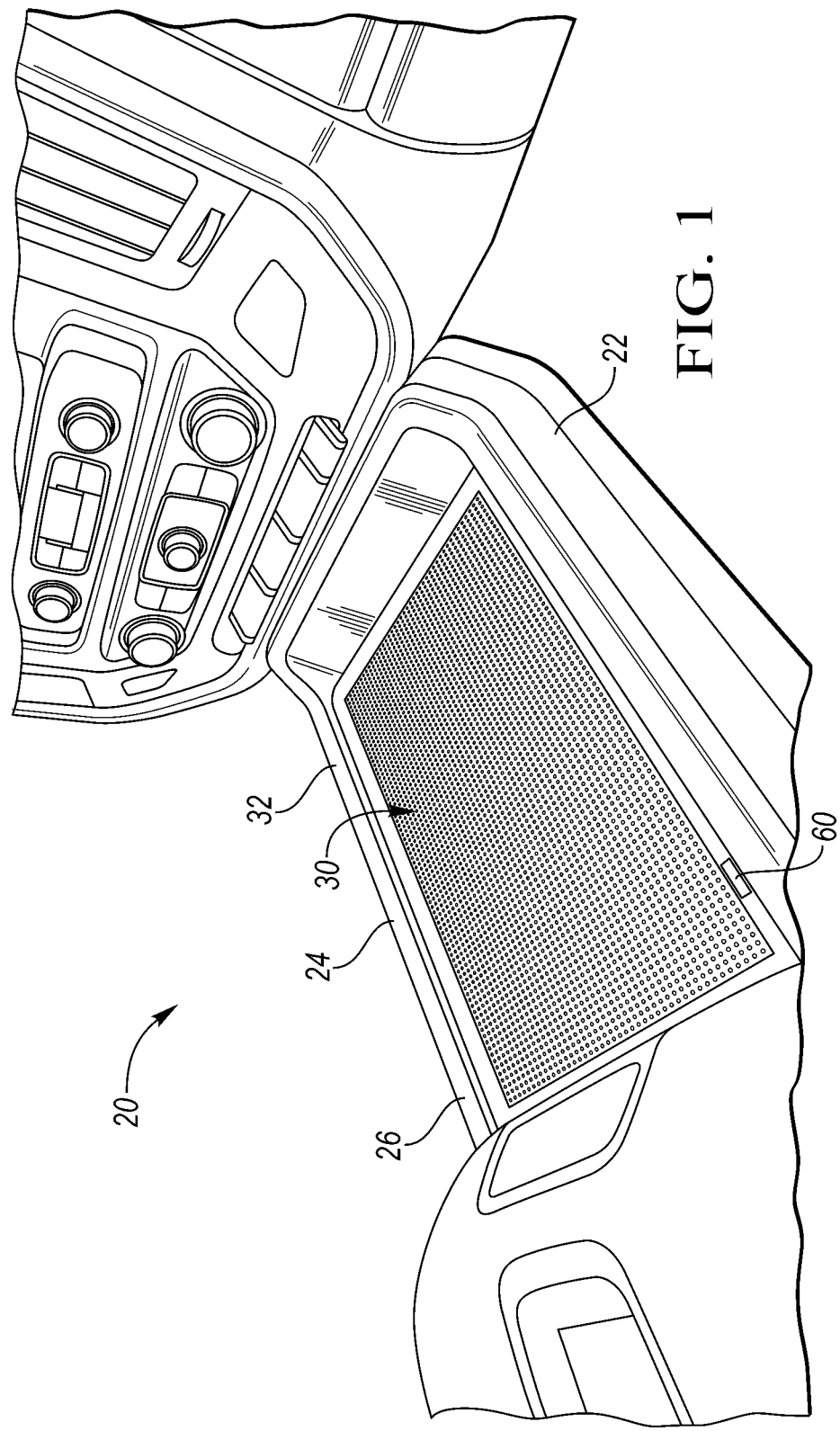

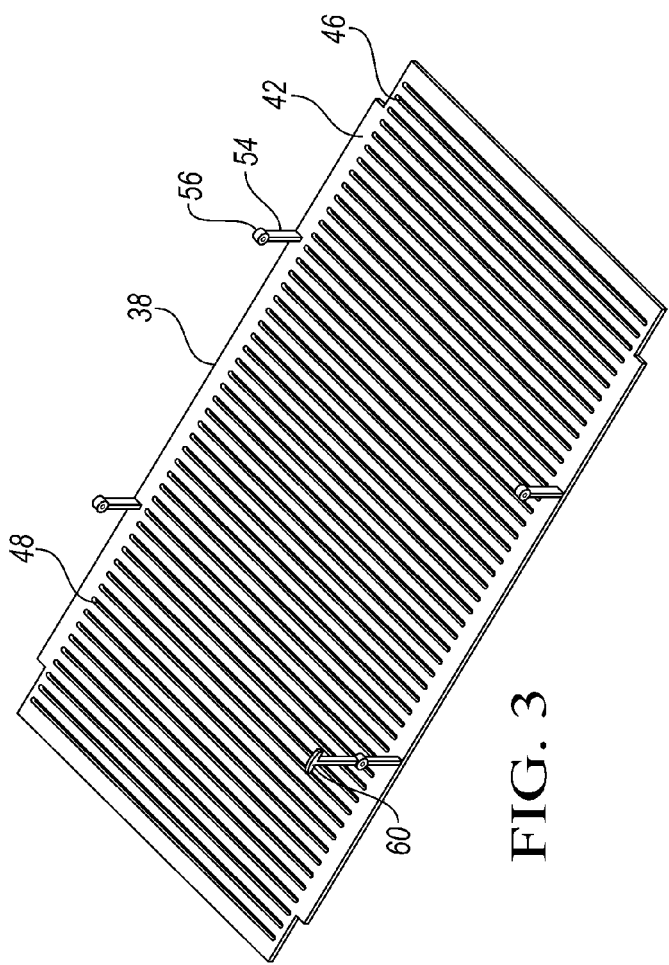
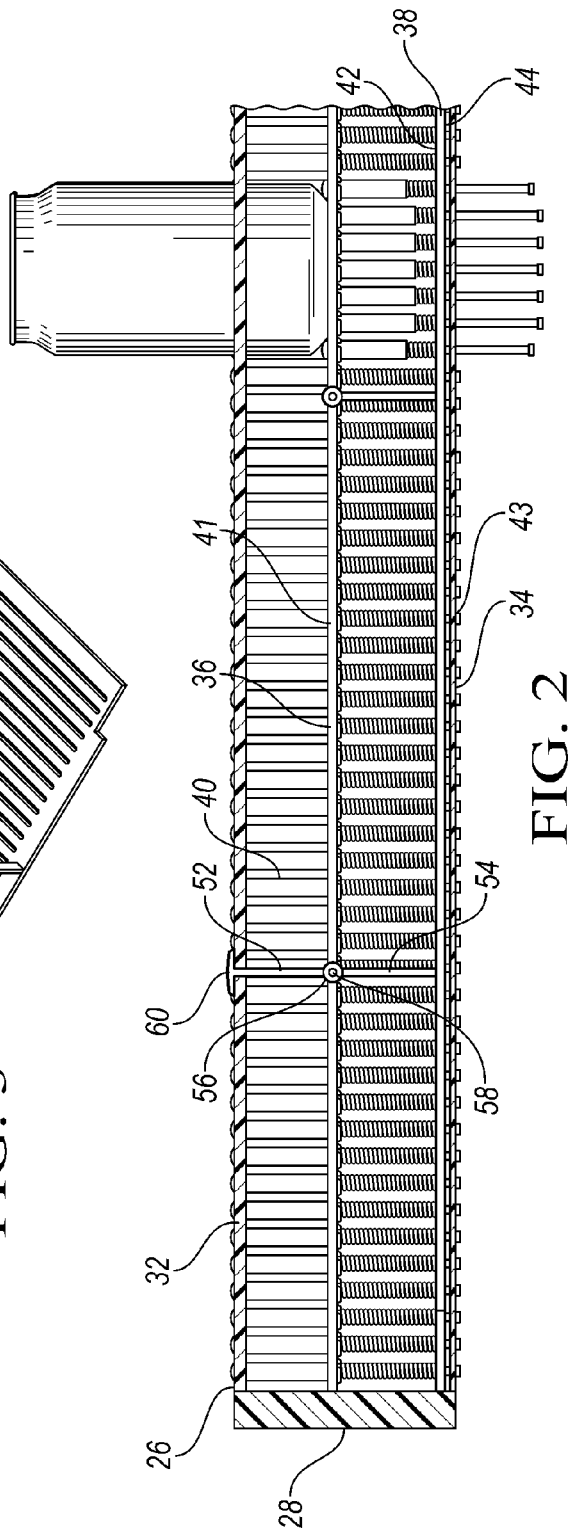

STORAGE BIN FOR A VEHICLE INTERIOR

TECHNICAL FIELD

The present disclosure relates to storage bins for motor vehicles.

BACKGROUND

Motor vehicles typically include storage bins disposed on or in various interior trim components, such as center consoles, dash boards, door panels and arm rests. The storage bins are utilized to hold beverages, cell phones, and other personal items. Traditional storage bins have a fixed size that may be either too large, or too small, for many items.

SUMMARY

According to one embodiment, a cup holder includes a base, a plurality of pins supported by the base, and a locking plate spaced away from the base. Each of the pins are biased in an extended position and movable to a depressed position in response to a downward force. The locking plate defines openings. Each of the pins extend through one of the openings. The locking plate is engageable with the pins to prevent movement of the pins.

According to another embodiment, a vehicle interior component includes a panel defining a recess. A storage bin is disposed within the recess and includes a base, a plurality of pins supported by and movable relative to the base, and a locking plate. The locking plate is movable relative to the pins and includes a plurality of sidewalls that are each engageable with one of the pins to lock the pins relative to the base in response to movement of the locking plate.

According to yet another embodiment, a storage bin includes a base, a plurality of pins supported by and moveable relative to the base, and a locking plate. The locking plate includes a plurality of sidewalls that each define an opening for one of the pins to pass therethrough. Each of the sidewalls are configured to engage one of the pins to lock the pins relative to the base in response to movement of the locking plate.

BRIEF DESCRIPTION OF THE DRAWINGS

FIG. 1 illustrates a perspective view of a center console including a storage bin.

FIG. 2 illustrates a side view, in cross-section, of the storage bin of FIG. 1.

FIG. 3 illustrates a perspective view of a locking plate of the storage bin of FIG. 1.

DETAILED DESCRIPTION

Figure 6:
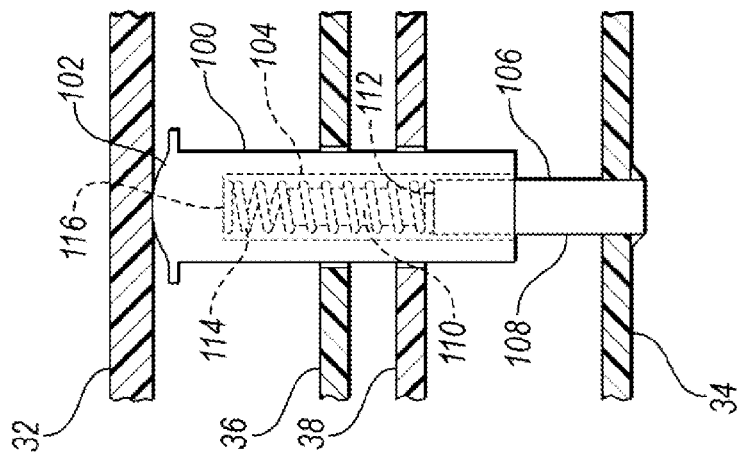
FIG. 6 illustrates a side view of yet another pin assembly.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIGS. 1, 2, and 3 a vehicle cabin 20 includes a center console 22 having at least one storage bin 24 built into the center console. The storage bin 24 may include a housing 26 having sidewalls 28 and a finished panel (or top surface) 32. The housing 26 defines a storage area 30 where items can be stored. The housing 26 includes a base 34 that may be connected to each of the sidewalls 28. A mid-plate 36 is disposed above the base 34 and below the finished panel 32. The mid-plate 36 may be attached to the sidewalls 28 and oriented parallel to the base 34. The mid-plate 36 may include holes 41, and the base 34 may include holes 43. The holes 41 are aligned with holes 43 such that a plurality of vertical pins 40 are each receivable through one of the holes in the mid-plate and a corresponding hole of the base 34. The mid-plate 36 and the base 34 provide lateral support for each of the vertical pins 40 while allowing the pins to freely move up and down. The storage bin 24 may be located on other components of the vehicle cabin—such as the dash, door panels, seat backs, and/or arm rests.

Each of the pins 40 is individually vertically displaceable relative to the base 34 between an extended position and a depressed position. The pins are spring biased to rest in the extended position. The pins 40 form a floating pin floor within the storage area 30. When an item is received within the storage area, the weight of the item causes the pins in contact with the item to depress downwardly. The surrounding pins not in contact with the item remain in the extended position. This creates a depression—in the floating pin floor—that is in the shape of the item. The surrounding pins that are not depressed define a ministorage area that prevents the item from sliding around the storage area 30, which could cause damage to the object or spills if the object is a beverage. Traditional cup holders have a fixed size that may be too large or too small for many different beverage containers or cups. The floating pin floor of storage bin 24 is able to take on many shapes and sizes to effectively secure a variety of different sized beverage containers.

A locking plate 38 is disposed between the base 34 and the mid-plate 36. The locking plate 38 may include a plurality of lower arms 54 connected to the mid-plate 36 to suspend the locking plate 38 above the base 34. The locking plate 38 may be pivotably attached to the mid-plate 36 allowing the locking plate 38 to displace horizontally. For example, the locking plate 38 may include a hub 56 disposed on an axle 58 projecting from the mid-plate 36. The locking plate 38 also includes an upper surface 42, a lower surface 44, and a plurality of slots 46 extending between the upper and lower surfaces. The slots 46 may be aligned in parallel rows. Each of the slots 46 may be defined by at least one sidewall 48. The slots 46 may be aligned with the holes 41, 43. Each of the pins 40 is disposed within one of the slots 46 when assembled. The locking plate 38 may be horizontally displaceable between a locked position and an unlocked position. When in the unlocked position, the slots 46 align with the holes 41, 43 allowing the pins 40 to vertically displace relative to the base 34. When in the locked position, at least a portion of each of the sidewalls 48 engages with one of the pins 40 to frictionally lock the pins 40 in a vertical position relative to the base 34. The locking plate 38 allows the floating pin floor to remain in a desired shape after the force on the pins 40 is removed.

The locking plate 38 may be actuated between the locked and unlocked positions by any mechanism known to a person skilled in the art. For example, an upper arm 52 may extend upwardly from one of the hubs 56 to a slide button 60. Movement of the slide button 60 causes the hubs 56 to pivot about the axles 58 causing the locking plate 38 to move horizontally and engage, or disengage, with the pins 40. The finished panel 32 may include a slot providing the upper arm 52 space to move. The slide button 60 and the finished panel 32 may include features for holding the slide button 60 in the locked position. For example, the finished panel 32 may include an L-shaped slot, a slot with a detent, or a tapered slot.

Figure 4:
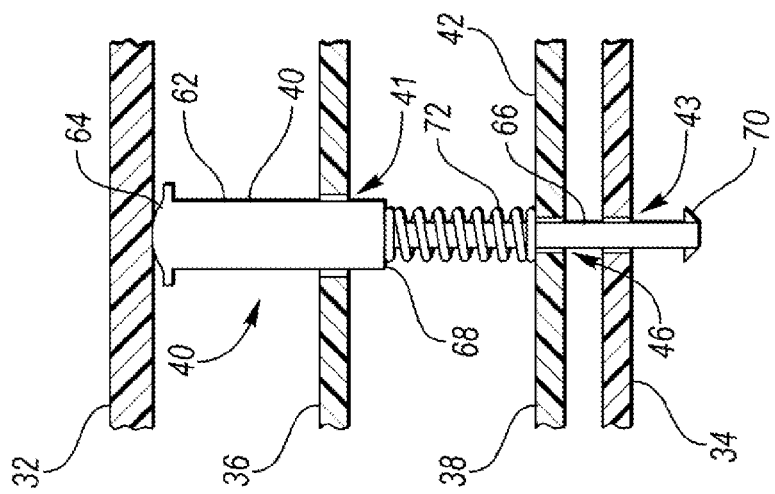
FIG. 4 illustrates a side view of a pin assembly of the storage bin of FIG. 1.

FIG. 4 illustrates a detail view of the pins 40 according to one embodiment. Each of the pins 40 may include an upper portion 62 having a head 64 defining an upper end, and a shaft 66 extending downwardly from a lower end of the upper portion 62. The upper portion 62, the head 64, and the shaft 66 may be integrally formed. The pin 40 may be arranged in the housing 26 with the upper portion 62 received through the mid-plate 36 and with the shaft 66 received through the locking plate 38 and the base 34. The head 64 may have a diameter larger than the hole 41 in the mid-plate to prevent the head 64 from traveling below the mid-plate 36. The pin 40 may include a shoulder 68 where the upper portion 62 and the shaft 66 meet. A spring 72 may be disposed on the shaft 66 between the shoulder 68 and the upper surface 42 of the locking plate 38. The shaft 66 may include a flared end 70 that is larger than the hole 43 in the base 34 to prevent the shaft 66 from dislodging from the base 34. Alternatively, a clip (or similar feature) may be used to retain the shaft 66 in the base 34.

In another embodiment, the locking plate may be arranged closer to the mid-plate 36 and engage with the upper portion 62. Here, the spring 72 is disposed below the locking plate 38 and is disposed between the base 34 and the shoulder 68.

Figure 5:
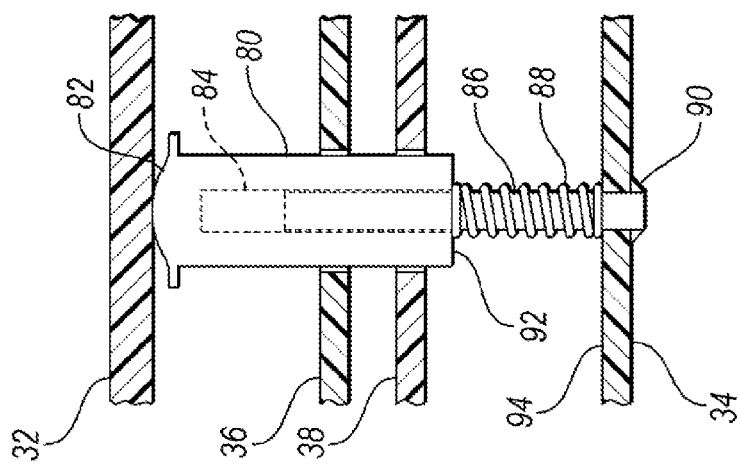
FIG. 5 illustrates a side view of another pin assembly.

FIGS. 5 and 6 illustrate alternative embodiments of the pins 40. Referring to FIG. 5, a pin 80 includes a head 82 and an internal sleeve 84. A projection 86 is connected to the base 34 and extends vertically upward therefrom. The projection 86 may include a clip 90 for retaining the projection in the base 34. Alternatively, the projection 86 and the base 34 may be integrally formed. The pin 80 may be received onto the projection 86 such that the sleeve 84 and the projection 86 can telescopically slide relative to each other. A spring 88 may be disposed between a lower end 92 of the pin 80 and an upper surface 94 of the base 34.

Referring to FIG. 6, a pin 100 includes a head 102 and an internal sleeve 104. A projection 106 is connected to the base 34 and extends vertically upward therefrom. The projection 106 may include a lower portion 108 and an upper portion 110. The lower portion 108 may have a larger diameter than the upper portion 110 creating a shoulder 112. The lower portion 108 may have a diameter that is substantially the same as the internal sleeve 104. The outer surface of the lower portion 108 may form the bearing surface upon which the pin 100 slides. A spring 114 may be disposed on the upper portion 110 between a ceiling 116 of the sleeve 104 and the shoulder 112.

The shapes of the pins and projection have been shown and described as cylindrical cylinders. But, the pins and the projections may have a different cross-sectional shape in other embodiments. For example, the pins and projections could have a square cross-section. The shape of the holes in the mid-plate and the locking plate correspond to the shape of the pins and vary according to the cross-sectional shape of the pins. The shape of the heads may be the same shape as the main body of the pins or may be a different shape. For example, the pins may have a circular cross-section while the heads may have a square cross-section. A number of different head shapes and sizes may be used. The density of pins 40 varies according to design needs and cost.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A cup holder comprising:
   a base;
   a plurality of pins supported by the base, wherein each of the pins is biased in an extended position and moveable to a depressed position in response to a downward force; and
   a locking plate spaced away from the base and defining openings, wherein each of the pins extends through one of the openings and wherein the plate is engageable with the pins to prevent movement of the pins.

2. The cup holder of claim 1 wherein each of the pins further includes an upper portion and a shaft extending downwardly from the upper portion, the shaft being slidably received through the base and configured to extend past a bottom surface of the base when the pin is in the depressed position.

3. The cup holder of claim 2 wherein the shaft extends through the locking plate, and wherein a spring is disposed on the shaft between the locking plate and the upper portion.

4. The cup holder of claim 1 wherein the base further includes a plurality of projections extending upwardly therefrom, and wherein each of the pins is disposed on one of the projections and configured to telescopically slide relative to the projections.

5. The cup holder of claim 1 further comprising a top surface, and an arm connected between the locking plate and the top surface such that actuation of the arm causes the locking plate to be horizontally displaceable relative to the pins.

6. The cup holder of claim 5 further comprising a mid-plate disposed between the top surface and the locking plate, wherein the arm is pivotably attached to the mid-plate.

7. A vehicle interior component comprising:
   a panel defining a recess; and
   a storage bin disposed within the recess and including
      a base, a plurality of pins supported by and moveable relative to the base, and a locking plate moveable relative to the pins and including a plurality of sidewalls each engageable with one the pins to lock the pins relative to the base in response to movement of the locking plate.

8. The component of claim 7, wherein the storage bin further includes a top surface, and an arm connected between the locking plate and the top surface such that actuation of the arm causes the at least one sidewall to engage or disengage with the pins.

9. The component of claim 8 wherein the storage bin further includes a mid-plate disposed between the top surface and the locking plate, wherein the arm is pivotably attached to the mid-plate.

10. The component of claim 7 wherein each of the pins is vertically displaceable between an extended position and a depressed position, and includes a spring configured to bias the pins to the extended position.

11. The component of claim 10 wherein each of the pins further includes an upper portion and a shaft extending downwardly from the upper portion, the shaft being slidably received through the base and configured to extend past a bottom surface of the base when the pin is in the depressed position.

12. The component of claim 11 wherein the shaft extends through the locking plate, and the spring is disposed on the shaft between the locking plate and the upper portion.

13. The component of claim 7 wherein the base further includes a plurality of projections extending upwardly from the base, and wherein each of the pins is disposed on one of the projections and configured to telescopically slide relative to the projections.

14. The component of claim 13 wherein each of the pins defines an inner sleeve that receives one of the projections.

15. The component of claim 14 wherein the storage bin further includes springs disposed on each of the projections within the inner sleeves.

16. A storage bin comprising:

a base, a plurality of pins supported by and moveable relative to the base, and a locking plate including a plurality of sidewalls each defining an opening for one of the pins to pass therethrough and each configured to engage one of the pins to lock the pins relative to the base in response to movement of the locking plate.

17. The storage bin of claim 16 further comprising a top surface, and an arm connected between the locking plate and the top surface such that actuation of the arm causes the sidewalls to engage or disengage the pins.

18. The storage bin of claim 17 further comprising a mid-plate disposed between the top surface and the locking plate, wherein the arm is pivotably attached to the mid-plate.

19. The storage bin of claim 16 wherein each of the pins is moveable between an extended position and a depressed position, and includes a spring configured to bias the pins to the extended position.

20. The storage bin of claim 16 wherein the base further includes a plurality of projections extending therefrom, and wherein each of the pins is disposed on one of the projections and configured to telescopically slide relative to the projections.

* * * * *